US012688207B2

(12) United States Patent
Singh et al.

(10) Patent No.: US 12,688,207 B2
(45) Date of Patent: Jul. 21, 2026

(54) MULTI-LEVEL DATABASE CATALOG

(71) Applicant: Amazon Technologies, Inc., Seattle, WA (US)

(72) Inventors: Vinay Singh, Sammamish, WA (US); Krishnaditya Kandregula, Redmond, WA (US); Sachet Saurabh, Sammamish, WA (US); Parikshit S Pol, Redmond, WA (US); Maheshdatta Mishra, Plainfield, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/902,556

(22) Filed: Sep. 30, 2024

(65) Prior Publication Data

US 2026/0093713 A1      Apr. 2, 2026

(51) Int. Cl.
*G06F 16/00* (2019.01)
*G06F 9/54* (2006.01)
*G06F 16/28* (2019.01)

(52) U.S. Cl.
CPC .............. *G06F 16/285* (2019.01); *G06F 9/54* (2013.01)

(58) Field of Classification Search
None
See application file for complete search history.

(56) References Cited

U.S. PATENT DOCUMENTS

| | | | | |
|---|---|---|---|---|
| 6,678,695 | B1* | 1/2004 | Bonneau ........... | G06F 16/24575 |
| | | | | 707/999.102 |
| 2005/0080791 | A1* | 4/2005 | Ghatare .............. | G06F 16/2452 |
| 2008/0065668 | A1* | 3/2008 | Spence ................. | G06Q 10/06 |
| 2015/0205674 | A1* | 7/2015 | Schroth .............. | G06F 11/1458 |
| | | | | 707/649 |
| 2017/0316032 | A1 | 11/2017 | Kamalaksha et al. | |
| 2018/0211297 | A1* | 7/2018 | Shilo ..................... | G06F 16/367 |
| 2018/0253361 | A1* | 9/2018 | Dhatrak .............. | G06F 11/3034 |
| 2018/0276268 | A1 | 9/2018 | Doval et al. | |
| 2021/0209758 | A1* | 7/2021 | Buckland .............. | G06F 18/243 |
| 2022/0159007 | A1* | 5/2022 | Dageville ........... | G06F 16/2455 |
| 2023/0090190 | A1* | 3/2023 | Iila ...................... | H04L 63/0876 |
| | | | | 726/1 |
| 2025/0106206 | A1* | 3/2025 | Pandharpure ........... | H04L 63/08 |

OTHER PUBLICATIONS

International Search Report and Written Opinion, re PCT Application No. PCT/US2025/048262, mailed Dec. 19, 2015.

* cited by examiner

*Primary Examiner* — Hasanul Mobin
(74) *Attorney, Agent, or Firm* — Knobbe, Martens, Olson & Bear, LLP

(57) ABSTRACT

An improved data system supports creation of multiple hierarchical database catalogs under a particular account. Users or organizations have the flexibility to organize their data, native or external, into an n-level hierarchy of their choice. There is a root database catalog of the account, and other catalogs (1 or n-levels) are created under it. The data system has extract, transform, and load (ETL) features that allows data to be moved between different data sources and targets.

20 Claims, 6 Drawing Sheets

FIG. 4

MULTI-LEVEL DATABASE CATALOG

BACKGROUND

In some existing data systems (such as data lakes, data warehouses, and/or metastores), there can be one catalog per account for an organization. Under that catalog, there can be multiple databases. Under each database, there can be multiple tables. In other existing data systems, there can be four level namespaces (such as metastore.catalog.database.table) or three level namespaces (such as database.schema.table). Some existing data systems may be incompatible with each other. For example, in one existing data system, the number of supported levels in a namespace may be fewer than the supported levels of another existing data system.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

FIG. 4 depicts another example user interface presented on the user computing device referenced in the environment depicted in FIG. 1B.

DETAILED DESCRIPTION

As described above, some existing data systems are limited to one catalog per account, multiple databases can be associated with the account, and multiple tables can be associated with each database. In some cases, greater flexibility in a data system would be advantageous. For example, for the same account, it would be advantageous if a catalog could represent multiple, separate organizational units, such as one catalog for production data, one catalog for development data, etc. Additionally or alternatively, the account could have multiple catalogs that logically organize the data in other ways, such as for different groups. Accordingly, as described herein, some existing data systems can have one or more limitations.

Generally described, aspects of the present disclosure are directed towards solutions that permit a multi-level database catalog with improved feature(s). As described herein, an improved data system (such as a data lake, data warehouse, and/or metastore) can support creation of multiple hierarchical database catalogs under a particular account. Users or organizations have the flexibility to organize their data, native or external, into an n-level hierarchy of their choice. In some embodiments, there is a root database catalog of the account, and other database catalogs (1 or n-levels) are created under it. The data system can include extract, transform, and load (ETL) features that can allow data to be moved between different data sources and targets. The data system can also support catalog level linking, which is described in further detail herein.

Figure 1A:
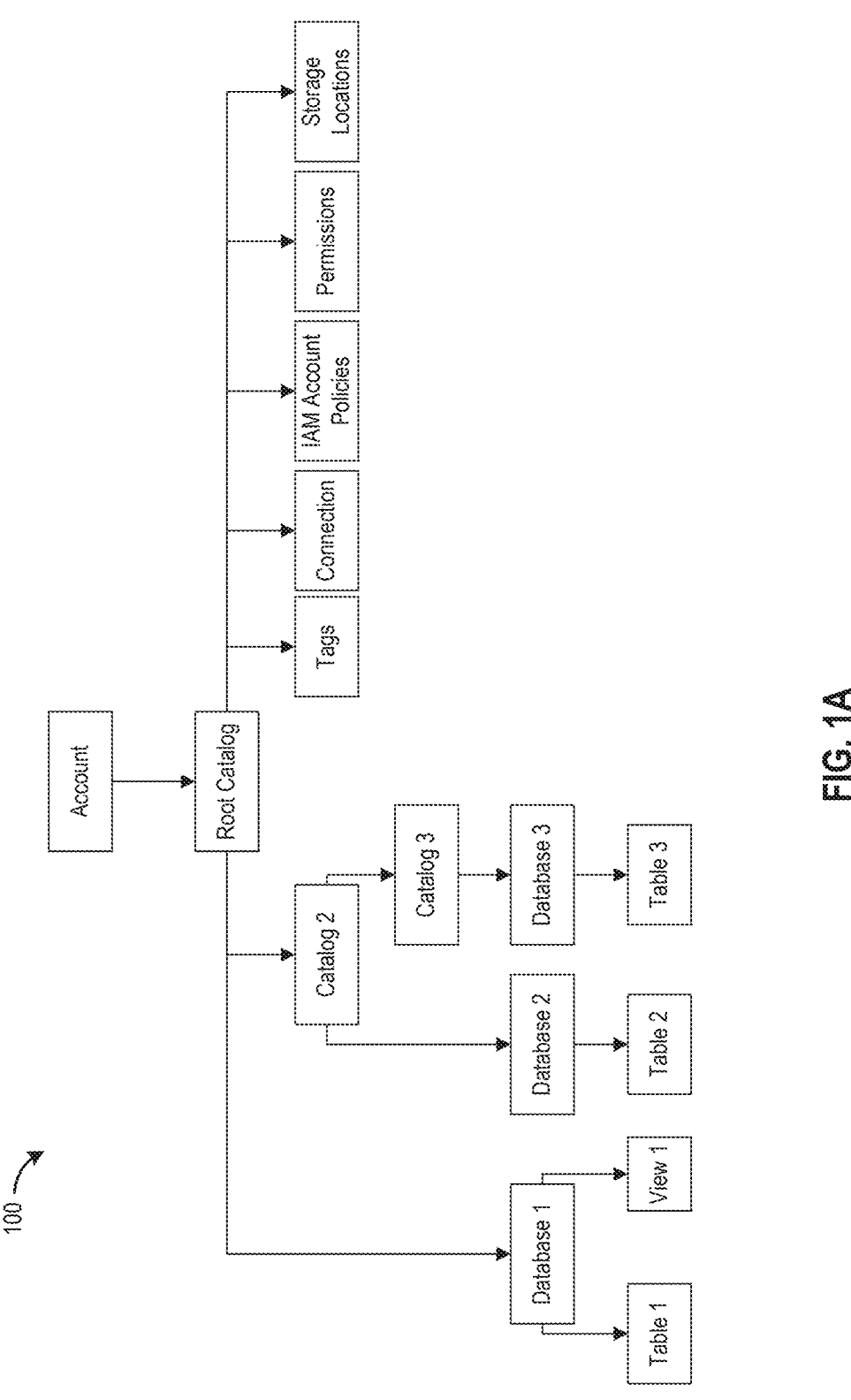
FIG. 1A is a block diagram depicting a catalog data structure for a multi-level database catalog.

Turning to FIG. 1A, a block diagram is shown depicting a catalog data structure 100 for a multi-level database catalog. As shown in the catalog data structure 100, an account can be associated with a root catalog. The catalog data structure 100 can include a hierarchy of nodes. As used herein, a "catalog" can refer to a component in a data system that stores metadata about an organization's data sets, such as, but not limited to, table definitions, job definitions, and/or other control information regarding ETL workflows. One or more database catalogs of the multi-level database catalog can be associated with metadata, such as, but not limited to, tags, connections, Identity and Access Management (IAM) account policies, permissions, and/or storage locations. As shown, an advantage of the multi-level database catalog and the catalog data structure 100 is that the account can be associated with multiple hierarchical database catalogs (here, the "Root Catalog," "Catalog 1", and "Catalog 3"). As described herein, existing/previous data systems may be limited to one database catalog per account. In the multi-level database catalog and the catalog data structure 100, each catalog can be associated with a database (such as the "Root Catalog" being the parent of "Database 1") or another database catalog (such as "Catalog 2" being the parent of "Catalog 3"). Each database can be associated with multiple tables, views, or other database components. In some embodiments, leaf nodes of the multi-level database catalog (and, therefore, leaf nodes of the catalog data structures) can include or be machine learning models. As described herein, an advantage of a multi-level database catalog is that database catalogs from other accounts or regions can be linked to another account/database catalog.

Another advantage of a multi-level database catalog is that data from another data store can be mounted to an account/catalog instead of separately mounting individual databases. As shown below in Table 1, other data systems (such as data lakes, data warehouses, and/or metastores) can have different hierarchies/naming conventions. As described herein, an existing/previous data system may allow mounting individual databases as the highest level that can be imported as opposed to being able to mount higher level catalog structures. With the existing/previous data system, mounting data and/or metadata from hierarchical components above the database level would not be possible. As described herein, an improved data system with multi-level database catalog support can enable mounting from other data systems with two or more levels.

TABLE 1

| Improved Data System | Existing Data System 1 | Existing Data System 2 | Existing Data System 3 | Existing Data System 4 |
|---|---|---|---|---|
| Root Catalog | | | | |
| Database Catalog (n-levels) | Namespace | Metastore | | |
| Database Catalog (n-levels) | Database | Catalog | Database | Catalog |
| Database Table | Schema Table | Schema Table | Schema Table | Database Table |

Existing data systems can include, but are not limited to, Databricks™ Unity Catalog, Snowflake®, and Apache Hive™. Some existing data systems, such as the Existing Data System 2 of Table 1, have four level namespaces (metastore.catalog.database.table). Other existing data systems, such as Existing Data System 3 of Table 1, have three level namespaces (database.schema.table). Since an improved data system can support n-level namespaces, the improved data system representations can be compatible with other existing data systems, which can enable mounting/representing objects within the improved data system.

The systems and methods described herein may improve database, data lake, data warehouse, and/or metastore technology. As described herein, some existing/previous data systems support only a single catalog per account. Thus, those data systems would be incompatible with other data systems that have a greater number of namespace levels. Accordingly, existing/previous data systems would be unable to mount/import any level above a database and mounting would be limited to the single database/table level. The systems and methods described herein can allow multi-level database catalogs and, therefore, mounting multiple levels of namespaces from other existing data systems can be possible. Accordingly, the systems and methods described herein may improve database, data lake, data warehouse, and/or metastore technology.

Figure 1B:
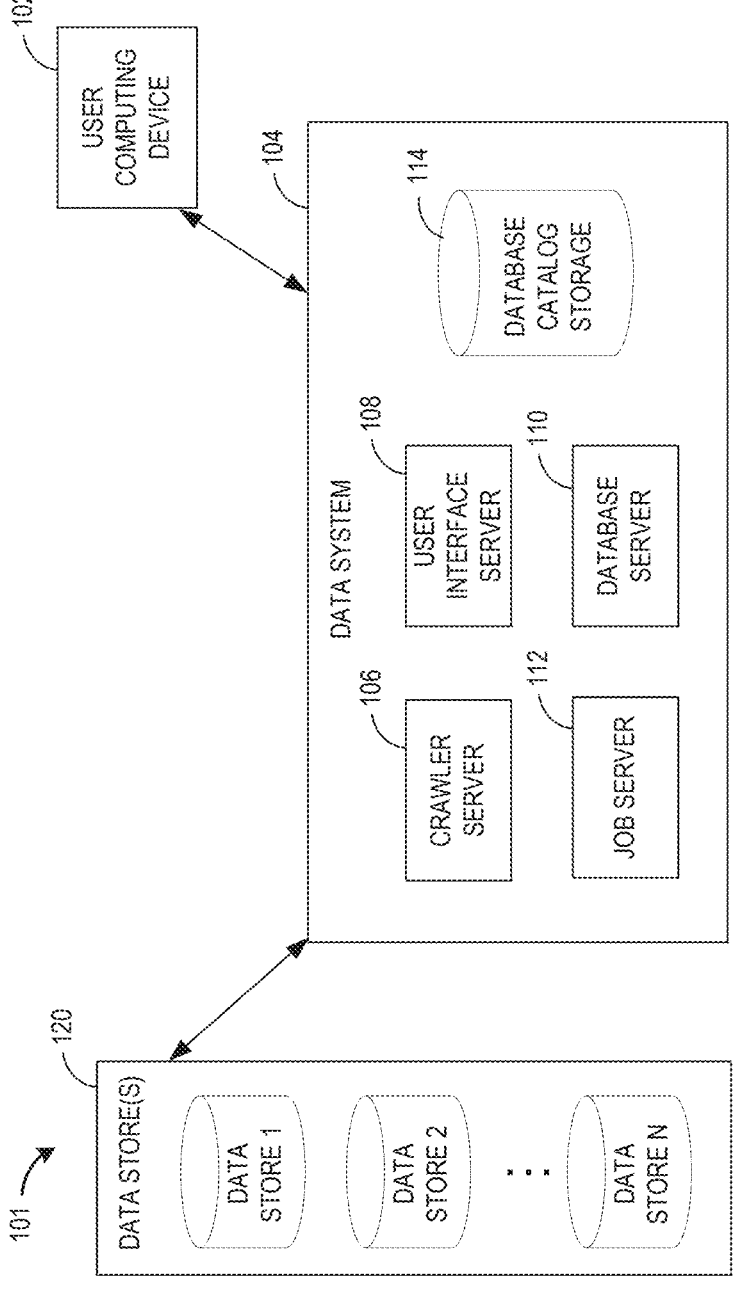
FIG. 1B is a schematic block diagram depicting an illustrative environment including a data system that can implement a multi-level database catalog.

In FIG. 1B, an illustrative environment 101 is depicted including a data system 104 that can implement multi-level database catalogs. The environment 101 can include one or more external data stores 120, the data system 104, and a user computing device 102. The data system 104 can include a crawler server 106, a user interface server 108, a database server 110, a job server 112, and a database catalog storage 114. Crawlers are programs that can connect to data sources (such as the external data stores 120), infer data schemas, and/or create metadata definitions in the data system 104. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage. The crawler server 106 can implement the crawler programs.

ETL jobs can include logic to extract data from sources, transform it using scripts, and load it into targets. The job server 112 can implement ETL jobs. The user interface server 108 can enable a user via the user computing device 102 to configure a multi-level database catalog and other aspects of the data system 104. User computing devices 102 can include, but are not limited to, a laptop or tablet computer, personal computer, personal digital assistant ("PDA"), hybrid PDA/mobile phone, smart wearable device (such as a smart watch), mobile phone, a smartphone, and/or a smart speaker.

The database server 110 can perform some of the actions described herein, such as, but not limited to, defining the multi-level database catalogs, linking at the database catalog level, and/or mounting data from external data stores 120. The database catalog storage 114 can store catalog data structures, metadata, and/or data including links, root database catalogs, n-level database catalogs, databases, tables, views, etc. In the data system 104, a workflow can involve defining data sources and targets in the database catalog; using crawlers to populate the database catalog with metadata from data sources; defining ETL jobs with transformation scripts to move and process data; running jobs on-demand or based on triggers; and/or monitoring job performance with interfaces. The data system 104 can receive, via an Application Programming Interface (API), commands from the user computing device 102, authorize the commands, and, if authorized, perform one or more commands, such as, but not limited to, defining the multi-level database catalogs, defining governance policies, linking at the database catalog level, mounting data from external data stores 120, and/or querying data from the multi-level database catalogs.

The database catalog storage 114 may be embodied in hard disk drives, solid state memories, or any other type of non-transitory computer readable storage medium. The database catalog storage 114 may also be distributed or partitioned across multiple local and/or remote storage devices.

The components of the environment 101, such as the data stores 120, the data system 104, and/or the user computing device can communicate over a network. The network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications ("GSM") network, a Code Division Multiple Access ("CDMA") network, a Long-Term Evolution ("LTE") network, or any other type of wireless network. The network can use protocols and components for communicating via the Internet or any of the other aforementioned types of networks, such as HTTP, TCP/IP, and/or UDP/IP.

The data system 104 may be embodied in a plurality of devices. The data system 104 may include a network interface, memory, hardware processor, and non-transitory computer-readable medium drive, all of which may communicate with each other by way of a communication bus. The network interface may provide connectivity over the network and/or other networks or computer systems. The hardware processor may communicate to and from memory containing program (a.k.a., computer-executable) instructions that the hardware processor executes in order to operate the data system 104. Memory generally includes RAM, ROM, and/or other persistent and/or auxiliary non-transitory computer readable storage media.

Additionally, in some embodiments, the data system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
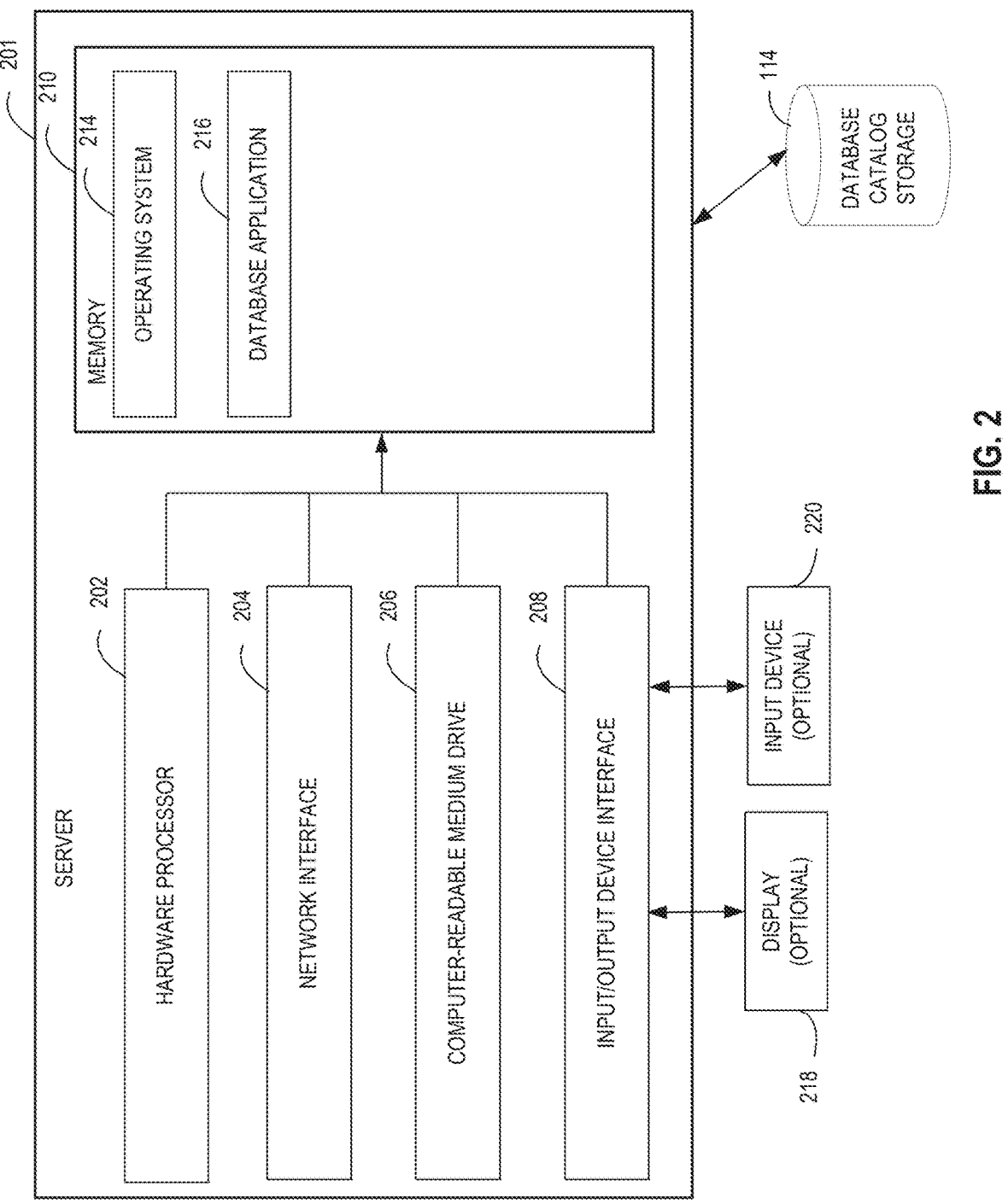
FIG. 2 is a schematic block diagram depicting an illustrative general architecture of a server for implementing aspects of the data system referenced in the environment depicted in FIG. 1B.

FIG. 2 is a schematic diagram of an illustrative general architecture of a server 201 for implementing the data system 104 referenced in the environment 101 in FIG. 1B. In particular, a server 201 can be used to implement the crawler server 106, the user interface server 108, the database server 110, and/or the job server 112. The server 201 includes an arrangement of computer hardware and software components that may be used to execute the database application 216. The general architecture of FIG. 2 can be used to implement other devices described herein, such as the user computing device 102 referenced in FIG. 1B. The server 201 may include more (or fewer) components than those shown in FIG. 2. Further, other computing systems described herein may include similar implementation arrangements of computer hardware and/or software components.

The server 201 for implementing a data system 104 may include a hardware processor 202, a network interface 204, a non-transitory computer-readable medium drive 206, and an input/output device interface 208, all of which may communicate with one another by way of a communication bus. As illustrated, the server 201 is associated with, or in communication with, an optional display 218 and an optional input device 220. The network interface 204 may provide the server 201 with connectivity to one or more networks or computing systems. The hardware processor 202 may thus receive information and instructions from other computing systems or services via a network. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen.

The memory 210 may contain specifically configured computer program instructions that the hardware processor 202 executes in order to implement one or more embodiments of a device within the data system 104. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the data system 104.

The memory 210 may include a database application 216 that may be executed by the hardware processor 202. The database application 216 can communicate with the database catalog storage 114, such as storing metadata and/or data in the database catalog storage 114. In some embodiments, the database application 216 may implement various aspects of the present disclosure. In some embodiments, the database application 216 can enable configuration of multi-level database catalogs, database catalog level linking support (such as linking different database catalogs from other accounts or regions to another account/database catalog), and/or catalog level mounting support (such as mounting data from another data store to an account/catalog instead of separately mounting individual databases).

Figure 3:
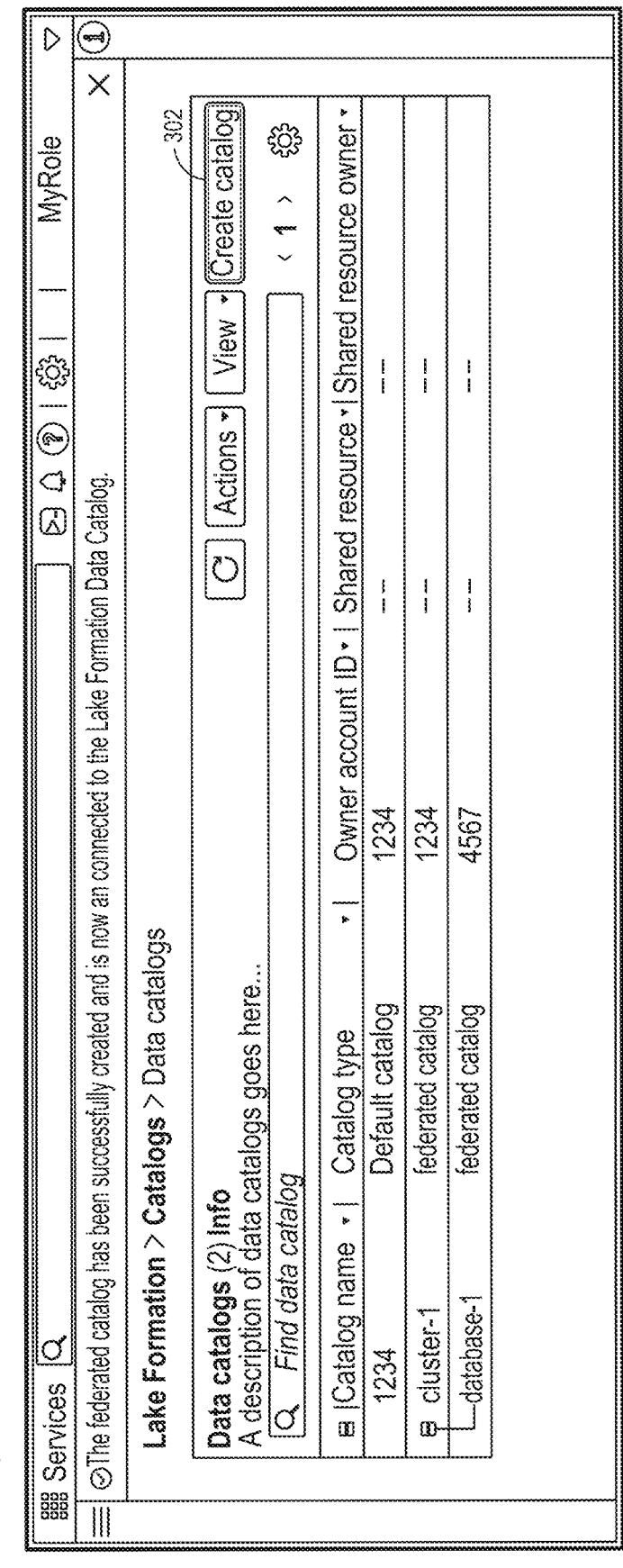
FIG. 3 depicts an example user interface presented on a user computing device referenced in the environment depicted in FIG. 1B.

FIG. 3 depicts a user interface 300 provided by the data system 104, which can be presented via the user computing device 102. As described herein, the data system 104 can support mounting data and metadata from external data stores 120. As shown, the user interface 300 can indicate that a default database catalog (here "1234") has a first child database catalog (here "cluster-1") and the first child database catalog has a second child database catalog (here "database-1"). Moreover, the user interface 300 can indicate that the child database catalogs (here "cluster-1" and "database-1") have been mounted from an external data store 120, which was not possible with some existing/previous data systems. A user can select the create database catalog element 302 to cause a database catalog creation user interface to be presented to the user. In some embodiments, a user interface similar to the user interface 300 of FIG. 3 can be used by a user to configure mounting data and metadata from the external data store into the children database catalogs shown in the user interface 300 of FIG. 3.

Figure 4:
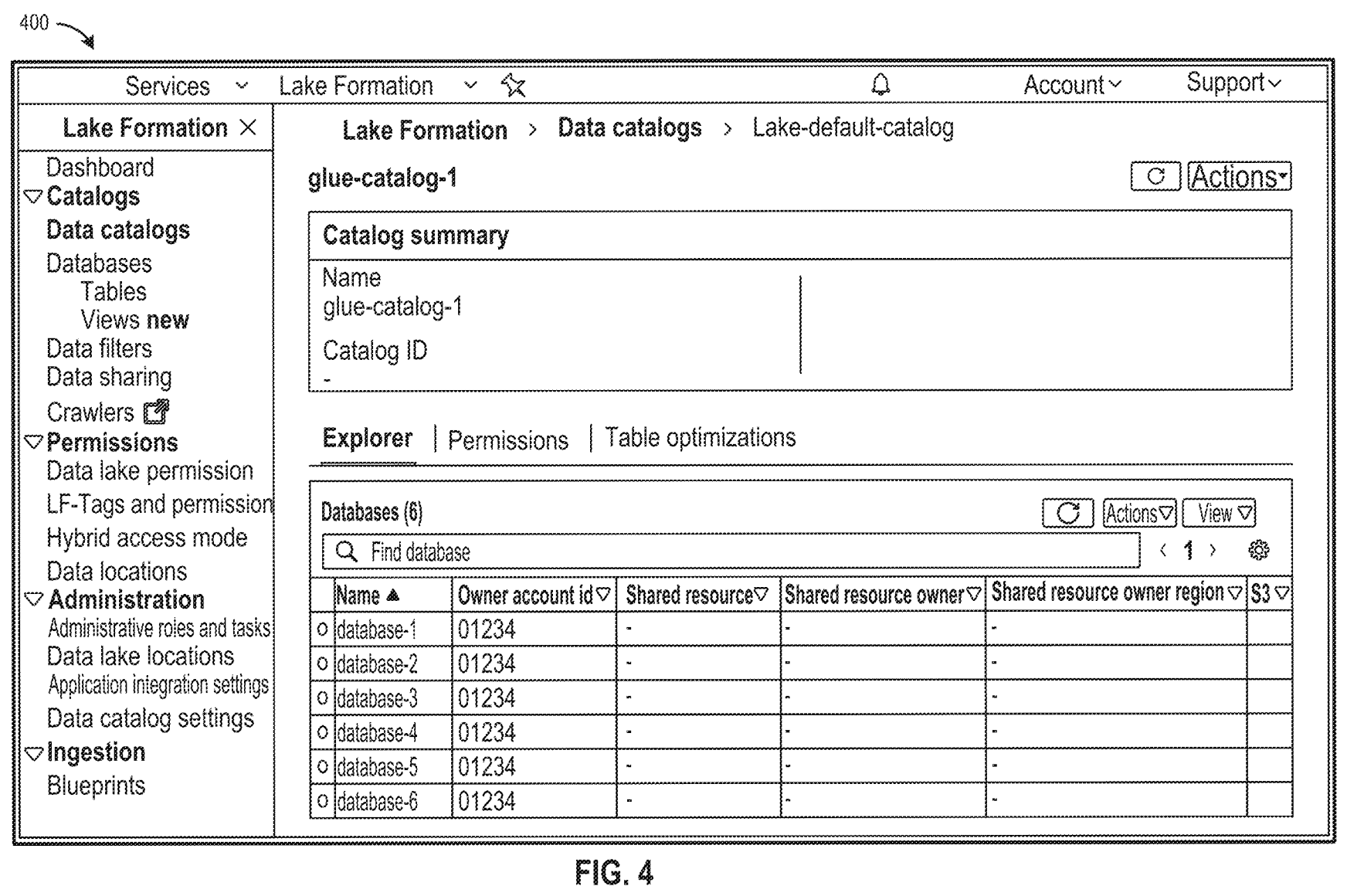

FIG. 4 depicts another user interface 400 provided by the data system 104, which can be presented via the user computing device 102. As described herein, the data system 104 can support n-levels of database catalogs and each leaf-level database catalog can be associated with one or more databases. As shown, the user interface 400 can indicate that a leaf-level catalog (here "glue-catalog-1") is associated with multiple databases (such as "database-1," "database-2," "database-3," "database-4," "database-5," and "database-6"). In some embodiments, a user interface similar to the user interface 400 of FIG. 4 can be used by a user to configure multiple levels of database catalogs, which was not possible with previous data systems.

Figure 5:
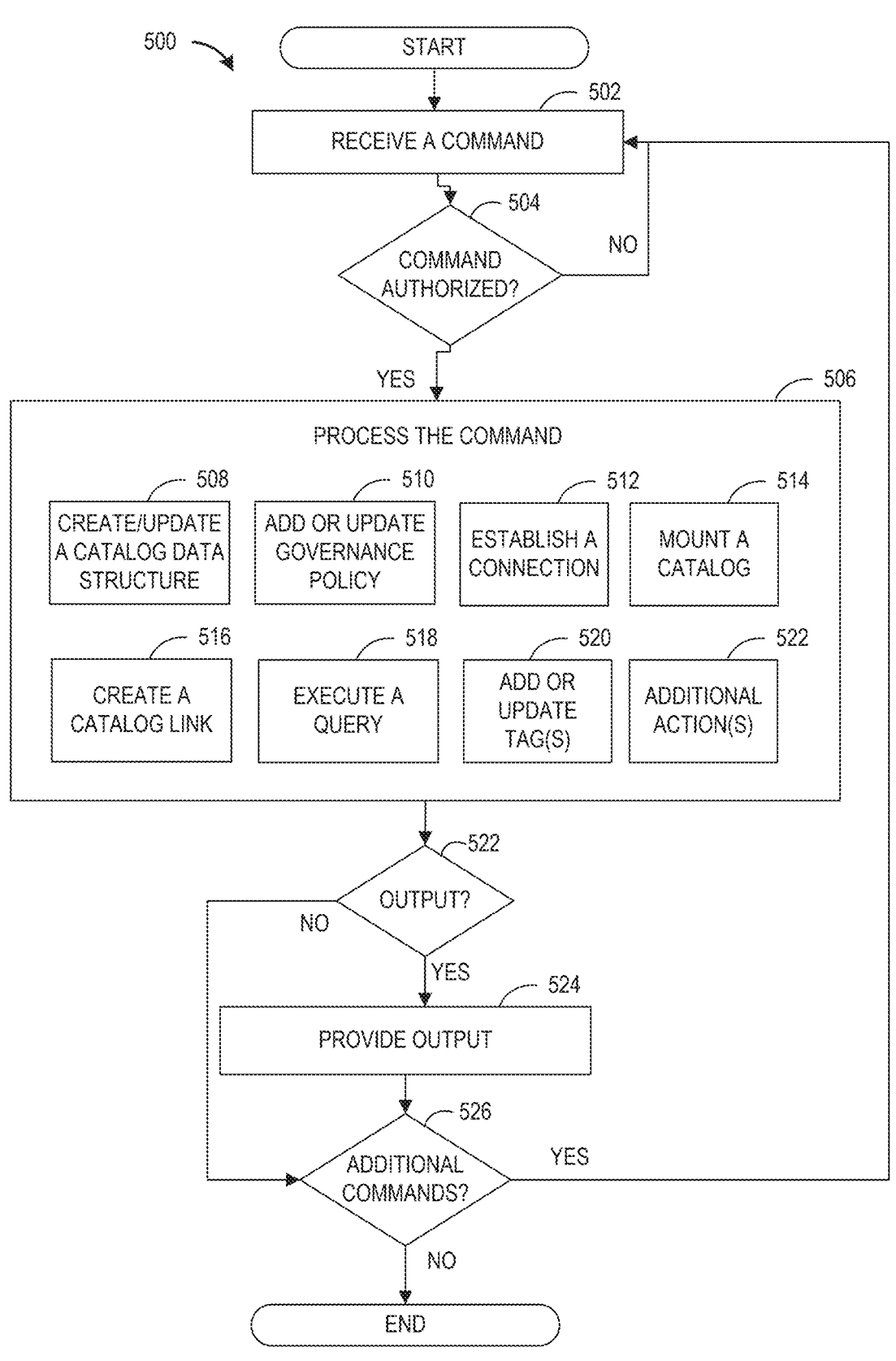
FIG. 5 is a flow chart depicting a method implemented by the data system for processing multi-level database catalog commands.

FIG. 5 includes a flow chart depicting a computer-implemented method 500 for processing multi-level database catalog commands. The method 500 can enable the multi-level database catalog features described herein. As described herein, aspects of the data system 104, which includes the crawler server 106, the user interface server 108, the database server 110, and the job server 112, may be implemented with the server 201 of FIG. 2. In some embodiments, the server 201 may include the database application 216, which may implement aspects of the method 500. Accordingly, the server 201 can implement aspects of the method 500.

Beginning at block 502, a command can be received. The data system 104 can receive (e.g., via an API) a command from the user computing device 102. The command can be to create a hierarchy of database catalogs. In some embodiments, user input can be received via a graphical user interface (such as the user interfaces 300, 400 of FIGS. 3-4) that causes an API command to be transmitted. Additionally or alternatively, commands can be received via a command-line interface. A database catalog can represent a logical grouping of databases, which can be bounded by data access requirements. Some use cases for database catalogs can include modeling organizational units (such as sensitive versus non-sensitive data) or software development lifecycle scopes (such as test/pre-prod/prod). A database catalog can be the highest level in the data system's 104 metadata hierarchy (such as database catalog(s)>database >table/view) managed under a single account profile. Each account can have a default database catalog, such as a root database catalog. An API command can fall back to a default database catalog if not explicitly mentioned in the command input. A database catalog can be a securable object, identified by a resource identifier, and with associated governance policies. In some embodiments, a database catalog can be managed using grant/revoke statements.

The API can define the format of the commands, such as the create commands shown below in Table 2. The commands described herein may be shown in a pseudo format and other formats can be used.

TABLE 2

```
// Creating a catalog under root
CreateCatalog {
    name : "Catalog2"
    parentCatalogId : "AccountId" // OR null
}
// Creating a catalog under a custom catalog
CreateCatalog {
    name : "Catalog3"
    parentCatalogId : "AccountId:Catalog2" // Full path
}
```

As described herein, users can have the flexibility to create a hierarchy of database catalogs. In some embodiments, hierarchical relationships can be represented with a delimiter, such as the "/" delimiter. Each database catalog can be referenced by its name prefixed with the name of its parents concatenated by a delimiter, such as the "/" delimiter. Since the root can be the default database catalog for an account profile, users can have the flexibility to either pass the full path, such as "AccountId: Catalog2/Catalog3," or a partial path, such as "Catalog2/Catalog3," as the catalogId. Also, since the default database catalog can be the root database catalog in an account the subsequent catalog hierarchy can be under the default/root database catalog.

As described herein, there can be different types of commands. For example, the data system 104 can receive, tifying a catalog from an external data store. The data system 104 can receive, via the API, a command to create a catalog link, the command including (i) a first identifier identifying a database catalog from a catalog data structure and (ii) a second identifier identifying a catalog from a different catalog data structure. The data system 104 can receive, via the API, to add or update a tag for a catalog. The data system 104 can receive, via the API, a command to access data associated with a database catalog.

At block 504, it can be determined whether the command is authorized. The data system 104 can determine whether the command is authorized based at least in part on a governance policy. The data system 104 can determine whether the command (such as a create database catalog, create database, or create table command) is authorized for the profile. If the command is authorized, the method 500 can proceed to block 506 to process the command. If the command is not authorized, the method 500 can return to block 502 to receive an additional command. In some cases, to execute a command, a profile must be authorized for a specific action. In some embodiments, specific actions can be authorized against a list of resources containing the resource in question and its parent. For example, Table 3 below provides an example IAM policy to access a table in the default/root database catalog. For other n-level database catalogs, the same convention can be followed and the IAM policy can contain the resource identifiers for the database catalogs (see Table 4 below). In some embodiments, to perform an operation related to n-level database catalogs or its resources, the profile must be given explicit allow permissions on the database catalog resource.

TABLE 3

```
Action : "getTable"
Resource : { [
    "resourceIdentifier:${Region}:${Account}:catalog",
    "resourceIdentifier:${Region}:${Account}:database/${DatabaseName}",
    "resourceIdentifier:${Region}:${Account}:table/${DatabaseName}/${TableName}",
]}
``` via an API, a command to add or update a governance policy for a database catalog. The data system 104 can receive, via Table 4 below provides an example IAM policy to access a table in an n-level database catalog.

TABLE 4

```
Action : "getTable"
Resource : { [
    "resourceIdentifier:${Region}:${Account}:catalog",
    "resourceIdentifier:${Region}:${Account}:catalog/catalog-a",
    "resourceIdentifier:${Region}:${Account}:catalog/catalog-a/catalog-b",
    . . .
    "resourceIdentifier:${Region}:${Account}:database/${DatabaseName}",
    "resourceIdentifier:${Region}:${Account}:table/${DatabaseName}/${TableName}",
]}
``` the API, a command to create a database associated with a database catalog. The data system 104 can receive, via the API, a command to create a connection, the command including (i) a connection type and (ii) a connection property indicating an external data store. The connection can be associated with a connection identifier. The data system 104 can receive, via the API, a command to mount an external catalog, the command including (i) a first identifier identifying a database catalog from a catalog data structure, (ii) the connection identifier, and (iii) a second identifier iden- At block 506, the command can be processed. The data system 104 can process the command based at least in part on the type of the command. If the command is a request to create a hierarchy of database catalogs, then the method 500 can process the create database catalog command at block 508 to create a catalog data structure. At block 508, the data system 104 can create, based at least in part on the create database catalog command, a catalog data structure with a first database catalog with a child second database catalog. As described herein, a multi-level database catalog and its corresponding catalog data structure can have n-levels of database catalogs. Additional details regarding a catalog data structure are provided herein, such as with respect to FIG. 1A and Table 2. If the command is a request to create a database, then the method 500 can process the create database command at block 508. The data system 104 can create, based at least in part on the create database command, a database associated with a database catalog that results in an updated catalog data structure.

In some embodiments, the command to create a hierarchy of database catalogs can specify a single database catalog that can be added to a catalog data structure. The data system 104 can add a single database catalog to the catalog data structure. Additionally or alternatively, multiple database catalogs can be specified to be created in a hierarchy within the catalog data structure. In some embodiments, the command to create a hierarchy of database catalogs could specify another hierarchy of database catalogs to mirror. The data system 104 can add multiple database catalogs in a hierarchy to the catalog data structure based at least in part catalog. The data system 104 can update, based at least in part on the command, the catalog data structure with the governance policy for the database catalog that results in an updated catalog data structure. As shown in the catalog data structure 100 of FIG. 1A, the governance policy can be stored in the IAM Account Policies or Permissions node(s).

The data system 104 can support governance policies at the account level. In some embodiments, the data system 104 can support adding policies at the account level via a put-resource-policy API. These policies can apply to child n-level database catalogs or resources belonging to it, where these policies can be fetched during their IAM authorization.

The data system 104 can support governance policies at the database catalog level. The data system 104 can support attaching/deleting/viewing policies at an individual database catalog level. In some embodiments, the data system 104 can support adding policies at the database catalog level via put-resource-policy, delete-resource-policy, and/or get-resource-policy APIs. An example governance policy, such as a resource policy, is provided below in Table 5.

TABLE 5

```
{
"Statement":[
  {
    "Profile":{
      "User":"1234"
    },
    "Effect":"Allow",
    "Action":[
      "getDatabase"
    ],
    "Resource":[
      "resourceIdentifier:us-east-1:3132:catalog",
      "resourceIdentifier:us-east-1:3132:catalog/catalog2",
      "resourceIdentifier:us-east-1:3132:catalog/catalog2/catalog3",
      "resourceIdentifier:us-east-1:3132:database/catalog2/catalog3/database3"
    ]
  }]
}
``` on a single command. The data system 104, while mirroring another hierarchy, can recursively traverse through the other hierarchy to create or modify the catalog data structure.

As described herein, a database in the multi-level database catalog and/or the catalog data structure can include a table or a volume. In some embodiments, the table can be the same or similar table format as a table in a Databricks Unity Catalog, Snowflake, and/or Apache Hive data system. The table can be a relational table in a relational database. The table can be logically structured as a collection of columns and rows. The table can store rows of data. In some embodiments, the volume can store objects, which can be similar to or the same as a Databricks Unity Catalog volume.

If the command is a request regarding a governance policy, then the method 500 can process the governance policy command at block 510 to add or update a governance policy. An advantage of the multi-level database catalog described herein is that particular governance policies can be applied to specific database catalogs. For example, users can write and submit governance policies such as "Grant" access to all tables under a particular database catalog level or "Deny" access to any table under a particular database catalog level unless a user profile has certain level of privilege. The data system 104 can receive, via the API, a command to add or update a first governance policy for a first database catalog and a different to command add or update a second governance policy for a second database As described herein, the data system 104 can support mounting data from another account/database catalog, which can be from an external data store. Previously, in some existing/previous data systems, users would be required to mount data at an individual database level since the existing/previous data system could not support the namespaces of other data systems. Accordingly, in some embodiments, an advantage of the multi-level database catalog described herein is that users can mount an entire external catalog with a single command. In some embodiments, establishment of a connection to an external data store may be a prerequisite mount data from the external data store.

If the command is a request to establish a connection, then the method 500 can process the connection command at block 512. The data system 104 can establish the connection with the external data store based at least in part on (i) a connection type and (ii) a connection property from the connection command. A connection can be established with a resource locator (such as a URL) and any credentials. In some embodiments, when a connection is established/created, the connection can be added to the catalog data structure. Example connection metadata, which can be included in the connection command, is provided below in Table 6.

TABLE 6

```
Connection {
    name : "connectionName", // Name of the connection,
    connectionType : "", // Enums of supported connection types
    connectionProperties {
        url : "", // resource identifier or network address for external data store
        credentials : ""
    }
}
```

If the command is a request to mount a catalog, then the method 500 can process the mount command at block 514. As described herein, users can connect to an external data store to load data from the data store into a multi-level database catalog. In some embodiments, data from a native database catalog can be mounted into another multi-level database catalog. In some embodiments, within a multi-level database catalog, there can be three categories of catalog: native, federated, and mixed. A native database catalog can be one in which the catalog is defined within the data system 104. The databases under a native database catalog can themselves be native (having tables/views defined natively) or federated (tables/views extracted from an external source). A federated catalog can be one in which the databases and their objects (tables, views, etc.) under the database catalog are fetched from an external source. A mixed database catalog can be one that has a database that has both native tables and tables from an external source.

In the case of mounting data from an external data store, the data system 104 can create a database catalog with the connection to the external data store. In the case of mounting data from a native database catalog, a connection to an external data store may not be needed. In the case of an external data store, the data system 104 can use (i) a first identifier identifying a database catalog from a catalog data structure, (ii) the connection, and (iii) a second identifier identifying a catalog from an external data store to create the database catalog. In some embodiments, the data system 104 can use the below parameters in Table 7 to create the database catalog. The data system 104 can fetch, with the connection, a data set from the external data store associated with the second identifier identifying a database catalog. The data system 104 can create, based at least in part on the command and the data set, one or more children nodes linked to a database catalog identified by the first identifier that results in an updated catalog data structure. As described herein, an advantage of the multi-level database catalog described herein is that the data system 104 can import multiple levels of database catalogs/databases to mirror the specified external catalog that can include multiple levels, which was a feature not previously available in a prior data system.

mount a database catalog associated with a second account. The received command can include (i) a first identifier identifying a database catalog from a catalog data structure and (ii) a second identifier identifying the database catalog associated with a second account. The data system 104 can fetch a data set from the database catalog identified by the second identifier. The data system 104 can create, based at least in part on the command and the data set, one or more children nodes linked to the database catalog identified by the first identifier that results in an updated catalog data structure.

If the command is a request to link a database catalog, then the method 500 can process the database catalog link command at block 516. The data system 104 can create, based at least in part on the command, a link between (i) the database catalog from a catalog data structure identified by the first identifier and (ii) the database catalog from a different catalog data structure identified by the second identifier. The database catalog level link can act as a canonical identifier and/or an alias. For example, a user can execute a query against a single multi-level database catalog that can reference multiple multi-level database catalogs due to the database catalog level link. Unlike mounting data, a database catalog level linking may not copy any of the underlying table level data.

The data system 104 can receive queries. The data system 104 can receive a query associated with a catalog data structure, where the query canonically refers to a linked database catalog as if it were included in the updated catalog data structure. If the command is a request to execute a query, then the method 500 can process the query command at block 518. The data system 104 can execute the query against a database associated with the linked database catalog that results in a result set. The data system 104 can provide the result set to the requesting computing device, as described herein such as with respect to the below block 524.

If the command is a request to add or update a tag for a database catalog, then the method 500 can process the tag command at block 520. Users can optionally assign tags to resources in a multi-level database catalog, including hierarchical database catalogs. A user can attach tags at the database catalog level and the child database catalogs can inherit a parent database catalog's tags. As used herein, a "tag" can refer to a label that can be assigned to a resource. Each tag can consist of a key and an optional value, both of which can be user-defined. Users can use tags in the data system 104 to organize and identify resources. Tags can be used to create reports and restrict access to resources. The data system 104 can update, based at least in part on the

TABLE 7

```
Catalog {
    name : "catalogName", // Name of the catalog
    mountedCatalog {
        connection : "", // Resource identifier of external connection or in-built connection
        identifier : "catalog identifier in the source",
            // Refers to the namespace where the source catalog resides
        role : "" // This is used for some of in-built connection
    }
}
```

The data system 104 can mount a native database catalog from a different account. For example, a first multi-level database catalog can be associated with a first account. The data system 104 can receive, via an API, a command to command, the catalog data structure with the tag for the database catalog that results in an updated catalog data structure. As shown in the catalog data structure 100 of FIG. 1A, the tags can be stored in the tag node.

A tag can be associated with access control. In some embodiments, the data system 104 can implement tag-based access control, which can be an authorization framework that defines permissions based on attributes. As described herein, a user can attach tags to resources in a multi-level database catalog and grant permissions to users, groups, and roles on those resources using the tags. The data system 104 can allow operations on those resources when the user profile's tag value matches the resource tag value. The data system can allow assigning tags to database catalogs. The database catalog level tags can be inherited by the child database catalogs, databases, tables, columns, and views of a parent database catalog with the tags. A pseudocode example of tag creation and assignment is provided below in Table 8.

TABLE 8

```
// Create a tag with different department values
CREATE TAG department VALUES ["Sales", "Finance", "HR"]
// Attach Sales tag value to Sales Catalog, and Grant permissions on it
ASSIGN TAG department=Sales TO CATALOG sales-catalog
GRANT TAGS module=Sales TO Sales-User1
GRANT TAGS module=Sales TO Sales-User2// Attach Finance tag value to Finance
Catalog, and Grant permissions on it
ASSIGN TAG department-Finance TO CATALOG Finance-catalog
GRANT TAGS module=Finance TO Finance-User1
GRANT TAGS module-Finance TO Finance-User2
```

For example, if at block 502, a command is received to access data associated with a database catalog, the next block 504 can determine if the command is authorized with tag-based access control. The data access request can be from a table/database that is a child of a database catalog with a tag. The data system 104 can determine a user profile associated with the command. The data system 104 can determine that the user profile is not associated with the tag. For example, the data system 104 can determine that the user profile does not have a matching tag as the tag associated with the database catalog. Accordingly, the data system 104 can deny, to the user profile, access to the data associated with the database catalog.

At block 522, additional actions can be performed. For example, the data system 104 can respond to retrieval commands, such as a GET command. Example get commands are provided below in Table 9, some of which can reference multi-level database catalogs.

TABLE 9

```
// Referencing a table under root catalog
GetTable {
    catalogId : "AccountId" // OR NULL
    databaseName : "Database1_1",
    tableName : "Table1_1"
}
// Referencing a table under one level nested catalog
GetTable {
    catalogId : "Catalog2" or "AccountId:Catalog2"
    databaseName : "Database2_1",
    tableName : "Table2_1"
}
// Referencing a table under two level nested catalog
GetTable {
    catalogId : "Catalog2/Catalog3" or "AccountId:Catalog2/Catalog3"
    databaseName : "Database3_1",
    tableName : "Table3_1"
}
```

The data system 104 can retrieve and provide a table as indicated by the catalog identifiers and with reference to the catalog data structure. Additional commands can include discovery related actions, such as "GetCatalog" or "Get-Catalogs," or deletion related actions, such as "DeleteCatalog," which can be authorized by corresponding governance policies. In some embodiments, the data system 104 can respond to requests from other platforms, such as a distributed processing system. For example, the data system 104 can respond to queries referencing multi-level database catalog identifiers.

At block 522, it can be determined if there is any output. The data system can determine if there is any output in response to processing the command at block 506. If there is output, the method 500 can proceed to block 524 to provide the output. Otherwise, the method 500 can proceed to block 526 to determine if there are any additional commands. If there are additional commands, the method can return to block 502 to process the next command. Otherwise the method 500 can end.

At block 524, output can be provided. For example, in response to processing a query, the data system 104 can provide a result set to the requesting computing device. If the command was a "GetTable" or a "GetCatalog" command, the data system 104 can provide the table or database catalog to the requesting computing device.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor ("DSP"), an ASIC, an FPGA or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:

one or more data storage media to store specific computer-executable instructions; and one or more computer hardware processors in communication with the one or more data storage media, wherein the specific computer-executable instructions configure the one or more computer hardware processors, upon execution of the specific computer-executable instructions, to at least:

receive, via an Application Programming Interface (API), a first command to create a hierarchy of database catalogs;

create, based at least in part on the first command, a catalog data structure comprising a first database catalog with a second database catalog, wherein the second database catalog is a child catalog of the first database catalog;

receive, via the API, a second command to add or update a first governance policy for the first database catalog;

update, based at least in part on the second command, the catalog data structure with the first governance policy for the first database catalog that results in a first updated catalog data structure;

receive, via the API, a third command to add or update a second governance policy for the second database catalog;

update, based at least in part on the third command, the first updated catalog data structure with the second governance policy for the second database catalog that results in a second updated catalog data structure;

receive, via the API, a fourth command to create a first database associated with the second database catalog;

determine that the fourth command is authorized based at least in part on the second governance policy; and

create, based at least in part on the fourth command, the first database associated with the second database catalog that results in a third updated catalog data structure.

2. The system of claim 1, wherein further computer-executable instructions configure the one or more computer hardware processors to at least:

receive, via the API, a fifth command to create a connection, the fifth command comprising (i) a connection type and (ii) a connection property indicating an external data store;

establish the connection with the external data store based at least in part on (i) the connection type and (ii) the connection property, wherein the connection is associated with a connection identifier;

receive, via the API, a sixth command to mount an external database catalog, the sixth command comprising (i) a first identifier identifying a third database catalog from the third updated catalog data structure, (ii) the connection identifier, and (iii) a second identifier identifying an external catalog from the external data store;

request, with the connection, a data set from the external data store associated with the second identifier; and create, based at least in part on the sixth command and the data set, a child node linked to the third database catalog identified by the first identifier that results in a fourth updated catalog data structure.

3. The system of claim 1, wherein further computer-executable instructions configure the one or more computer hardware processors to at least:

receive, via the API, a fifth command to create a catalog link, the fifth command comprising (i) a first identifier identifying a third database catalog from the third updated catalog data structure and (ii) a second identifier identifying a fourth database catalog from a different catalog data structure; and create, based at least in part on the fifth command, a link between (i) the third database catalog and (ii) the fourth database catalog.

4. The system of claim 3, wherein additional computer-executable instructions configure the one or more computer hardware processors to at least:

receive a query associated with the third updated catalog data structure, wherein the query canonically refers to the fourth database catalog as if it were included in the third updated catalog data structure;

execute the query against a database associated with the fourth database catalog that results in a first result set; and provide the first result set from the query that is executed.

5. The system of claim 1, wherein further computer-executable instructions configure the one or more computer hardware processors to at least:

receive, via the API, a fifth command to add or update a tag for the second database catalog; and update, based at least in part on the fifth command, the third updated catalog data structure with the tag for the second database catalog that results in a fourth updated catalog data structure.

6. The system of claim 5, wherein the tag is associated with access control, and wherein additional computer-executable instructions configure the one or more computer hardware processors to at least:

receive, via the API, a sixth command to access data associated with the second database catalog;

determine a user profile associated with the sixth command;

determine that the user profile is not associated with the tag; and deny, to the user profile, access to the data associated with the second database catalog.

7. A computer-implemented method comprising:

receiving, via an Application Programming Interface (API), a first command to create a hierarchy of database catalogs;

creating, based at least in part on the first command, a catalog data structure comprising a first database catalog with a second database catalog, wherein the second database catalog is a child catalog of the first database catalog;

receiving, via the API, a second command to add or update a governance policy for the second database catalog;

updating, based at least in part on the second command, the catalog data structure with the governance policy for the second database catalog that results in a first updated catalog data structure;

receiving, via the API, a third command to create a first database associated with the second database catalog;

determining that the third command is authorized based at least in part on the governance policy; and creating, based at least in part on the third command, the first database associated with the second database catalog that results in a second updated catalog data structure.

8. The computer-implemented method of claim 7, further comprising:

receiving, via the API, a fourth command to create a connection, the fourth command comprising (i) a connection type and (ii) a connection property indicating an external data store;

establishing the connection with the external data store based at least in part on (i) the connection type and (ii) the connection property;

receiving, via the API, a fifth command to mount an external catalog, the fifth command comprising (i) a first identifier identifying a database catalog from the second updated catalog data structure, (ii) the connection, and (iii) a second identifier identifying a catalog from the external data store;

fetching, with the connection, a data set from the external data store associated with the second identifier; and creating, based at least in part on the fifth command and the data set, a child node linked to a database catalog identified by the first identifier that results in a third updated catalog data structure.

9. The computer-implemented method of claim 7, further comprising:

receiving, via the API, a fourth command to create a catalog link, the fourth command comprising (i) a first identifier identifying a third database catalog from the second updated catalog data structure and (ii) a second identifier identifying a fourth database catalog from a different catalog data structure; and creating, based at least in part on the fourth command, a link between (i) the third database catalog and (ii) the fourth database catalog.

10. The computer-implemented method of claim 9, further comprising:

receiving a query associated with the second updated catalog data structure, wherein the query canonically refs to the fourth database catalog as if it were included in the second updated catalog data structure;

executing the query against a database associated with the fourth database catalog that results in a first result set; and providing the first result set from the query that is executed.

11. The computer-implemented method of claim 7, further comprising:

receiving, via the API, a fourth command to add or update a tag for the second database catalog; and updating, based at least in part on the fourth command, the second updated catalog data structure with the tag for the second database catalog that results in a third updated catalog data structure.

12. The computer-implemented method of claim 11, wherein the tag is associated with access control, further comprising:

receiving, via the API, a fifth command to access data associated with the second database catalog;

determining a user profile associated with the fifth command;

determining that the user profile is not associated with the tag; and denying, to the user profile, access to the data associated with the second database catalog.

13. The computer-implemented method of claim 7, wherein the second updated catalog data structure is associated with a first account, further comprising:

receiving, via the API, a fourth command to mount a database catalog associated with a second account, the fourth command comprising (i) a first identifier identifying a database catalog from the second updated catalog data structure and (ii) a second identifier identifying the database catalog associated with a second account;

fetching a data set from the database catalog identified by the second identifier; and creating, based at least in part on the fourth command and the data set, one or more children nodes linked to the database catalog identified by the first identifier that results in a third updated catalog data structure.

14. A system comprising:

one or more data storage media to store specific computer-executable instructions; and one or more computer hardware processors in communication with the one or more data storage media, wherein the specific computer-executable instructions configure the one or more computer hardware processors, upon execution of the specific computer-executable instructions, to at least:

receive, via an Application Programming Interface (API), a first command to create a connection, the first command comprising (i) a connection type and (ii) a connection property indicating an external data store;

establish the connection with the external data store based at least in part on (i) the connection type and (ii) the connection property;

receive, via the API, a second command to mount an external catalog, the second command comprising (i) a first identifier identifying a first database catalog, (ii) the connection, and (iii) a second identifier identifying a catalog from the external data store; and fetch, with the connection, a data set from the external data store associated with the second identifier; and create, based at least in part on the second command and the data set, a child node linked to the first database catalog that results in a catalog data structure.

15. The system of claim 14, wherein further computer-executable instructions configure the one or more computer hardware processors to at least:

receive, via the API, a fourth command to create a connection, the fourth command comprising (i) a connection type and (ii) a connection property indicating an external data store;

establish the connection with the external data store based at least in part on (i) the connection type and (ii) the connection property;

receive, via the API, a fifth command to mount an external catalog, the fifth command comprising (i) a first identifier identifying a catalog from the catalog data structure, (ii) the connection, and (iii) a second identifier identifying a catalog from the external data store;

fetch, with the connection, a data set from the external data store associated with the second identifier; and create, based at least in part on the fifth command and the data set, one or more children nodes linked to a catalog identified by the first identifier that results in an updated catalog data structure.

16. The system of claim 15, wherein the first database catalog comprises at least one of a table or a volume.

17. The system of claim 14, wherein further computer-executable instructions configure the one or more computer hardware processors to at least:

receive, via the API, a third command to create a catalog link, the third command comprising (i) a third identifier identifying a third database catalog from the catalog data structure and (ii) a second identifier identifying a fourth database catalog from a different catalog data structure; and create, based at least in part on the third command, a link between (i) the third database catalog and (ii) the fourth database catalog.

18. The system of claim 17, wherein additional computer-executable instructions configure the one or more computer hardware processors to at least:

receive a query associated with the catalog data structure, wherein the query canonically refers to the fourth database catalog as if it were included in the catalog data structure;

execute the query against a database associated with the fourth database catalog that results in a first result set; and provide the first result set from the query that is executed.

19. The system of claim 14, wherein further computer-executable instructions configure the one or more computer hardware processors to at least:

receive, via the API, a third command to add or update a tag for the first database catalog; and update, based at least in part on the third command, the catalog data structure with the tag for the first database catalog that results in a second updated catalog data structure.

20. The system of claim 19, wherein the tag is associated with access control, wherein additional computer-executable instructions configure the one or more computer hardware processors to at least:

receive, via the API, a fourth command to access data associated with the first database catalog;

determine a user profile associated with the fourth command;

determine that the user profile is not associated with the
  tag; and
deny, to the user profile, access to the data associated with
  the first database catalog.

* * * * *